(12) United States Patent
Huang et al.

(10) Patent No.: US 12,481,169 B2
(45) Date of Patent: Nov. 25, 2025

(54) OPTICAL SYSTEM AND HEAD-UP DISPLAY

(71) Applicant: Innolux Corporation, Miao-Li County (TW)

(72) Inventors: Yu-Chia Huang, Miao-Li County (TW); Tsung-Han Tsai, Miao-Li County (TW); Kuan-Feng Lee, Miao-Li County (TW)

(73) Assignee: Innolux Corporation, Miaoli (TW)

( * ) Notice: Subject to any disclaimer, the term of this patent is extended or adjusted under 35 U.S.C. 154(b) by 651 days.

(21) Appl. No.: 17/506,645

(22) Filed: Oct. 20, 2021

(65) Prior Publication Data

US 2022/0163813 A1 May 26, 2022

(30) Foreign Application Priority Data

Nov. 20, 2020 (CN) .......................... 202011311357.3

(51) Int. Cl.
| | |
|---|---|
| *G02B 27/30* | (2006.01) |
| *G02B 27/01* | (2006.01) |
| *H01L 25/075* | (2006.01) |
| *H10H 20/851* | (2025.01) |
| *H10H 20/855* | (2025.01) |
| *H10H 20/856* | (2025.01) |

(52) U.S. Cl.
CPC ......... *G02B 27/30* (2013.01); *G02B 27/0101* (2013.01); *H01L 25/0753* (2013.01); *H10H 20/851* (2025.01); *H10H 20/855* (2025.01); *H10H 20/856* (2025.01); *G02B 2027/0118* (2013.01)

(58) Field of Classification Search
CPC . G02B 27/30; G02B 27/0101; H01L 25/0753; H01L 33/50; H01L 33/52
USPC .......................................................... 359/641
See application file for complete search history.

(56) References Cited

U.S. PATENT DOCUMENTS

| | | | |
|---|---|---|---|
| 2006/0001030 A1* | 1/2006 | Okuwaki | ............ H01L 25/0753 257/431 |
| 2010/0321640 A1* | 12/2010 | Yeh | ...................... G03B 21/005 353/31 |
| 2019/0265472 A1* | 8/2019 | Sugiyama | ............... B60K 35/00 |
| 2020/0033600 A1 | 1/2020 | Kweon et al. | |
| 2021/0175271 A1* | 6/2021 | Lee | ..................... H10F 39/8057 |

FOREIGN PATENT DOCUMENTS

| | | |
|---|---|---|
| CN | 103348278 | 10/2013 |
| CN | 105785570 | 7/2016 |

OTHER PUBLICATIONS

"Office Action of China Counterpart Application", issued on Mar. 19, 2024, p. 1-p. 6.

* cited by examiner

*Primary Examiner* — Jerry L Brooks
(74) *Attorney, Agent, or Firm* — JCIPRNET

(57) ABSTRACT

An optical system including a self-emitting display and an optical element is provided. The self-emitting display emits a collimated light from a surface. The optical element is disposed on a moving path of the collimated light. A head-up display is further provided.

10 Claims, 14 Drawing Sheets

OPTICAL SYSTEM AND HEAD-UP DISPLAY

CROSS-REFERENCE TO RELATED APPLICATION

This application claims the priority benefit of China application serial no. 202011311357.3, filed on Nov. 20, 2020. The entirety of the above-mentioned patent application is hereby incorporated by reference herein and made a part of this specification.

BACKGROUND

1. Technical Field

The disclosure relates to an optical system and a head-up display.

2. Description of Related Art

In an optical system, the large-angle light emitted by an image source cannot be utilized by optical elements, resulting in insufficient luminous efficiency. In order to achieve the required brightness or contrast for the imaging quality of an optical system, the output power of the image source is increased, resulting in problems such as increased power consumption or increased operating temperature. Therefore, how to solve the above problems is an important issue.

SUMMARY

The disclosure provides an optical system and a head-up display, which help improve luminous efficiency.

According to the embodiments of the disclosure, the optical system includes a self-emitting display and an optical element. The self-emitting display emits a collimated light from a surface. The optical element is disposed on a moving path of the collimated light.

According to the embodiments of the disclosure, a head-up display includes an optical system. The optical system includes a self-emitting display and an optical element. The self-emitting display emits a collimated light from a surface. The optical element is disposed on a moving path of the collimated light.

In order to make the above-mentioned features and advantages of the disclosure more obvious and understandable, the following specific embodiments are described in detail in conjunction with the accompanying drawings.

BRIEF DESCRIPTION OF THE DRAWINGS

The accompanying drawings are included to provide a further understanding of the disclosure, and are incorporated in and constitute a part of the disclosure. The drawings illustrate embodiments of the disclosure and, together with the description, serve to explain the principles of the disclosure.

DESCRIPTION OF THE EMBODIMENTS

Figure 1:
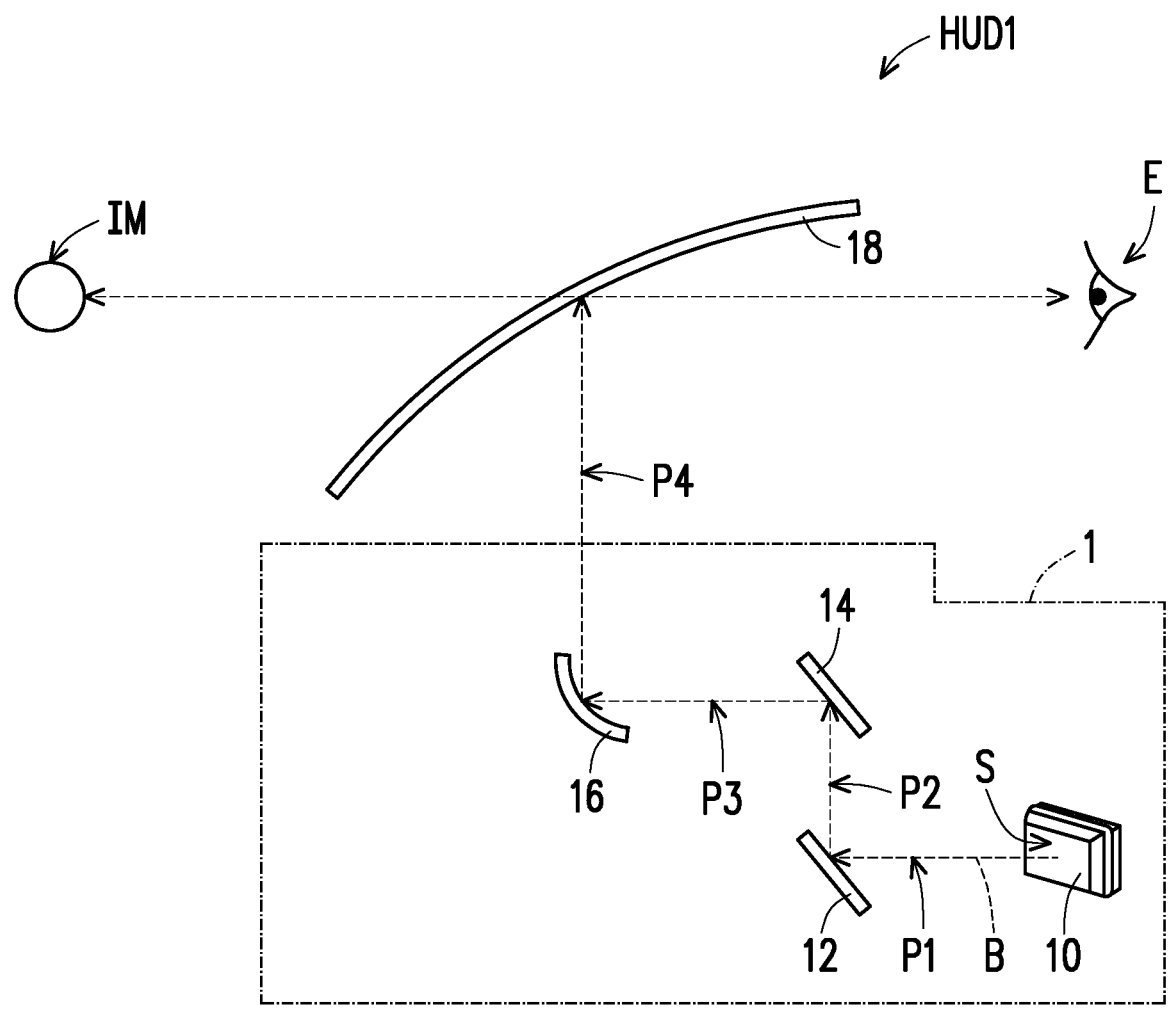
FIG. 1 is a schematic diagram of a head-up display according to a first embodiment of the disclosure.

The disclosure can be understood by referring to the following detailed description in conjunction with the accompanying drawings. It should be noted that in order to facilitate the reader's understanding and the simplicity of the drawings, only a part of the electronic device is drawn in the multiple diagrams in the disclosure. Moreover, the specific components in the drawings are not drawn according to actual scale. In addition, the number and size of each component in the drawings are only for illustration, and are not used to limit the scope of the disclosure. For example, for clarity, the relative size, thickness, and position of each layer, region, and/or structure may be reduced or enlarged.

Certain terms are used throughout the specification and appended claims of the disclosure to refer to specific components. Those skilled in the art should understand that electronic device manufacturers may refer to the same components by different names. The disclosure does not intend to distinguish between components that have the same function but different names. In the following specification and claims, terms such as "including", "comprising", and "having" are open-ended terms, so should be interpreted as meaning "including but not limited to . . . ."

The directional terms mentioned in the disclosure, for example: "upper", "lower", "front", "rear", "left", "right" and the like are only directions with reference to the accompanying drawings. Therefore, the directional terms used are for illustration, but not to limit the disclosure. When a component or a film layer is referred to as being "on" or "connected to" another component or film layer, the component or the film layer may be directly on or directly connected to the other component or film layer, or there may be an inserted component or film layer between the two (indirect case). Conversely, when a component is referred to as being "directly on" or "directly connected to" another component, there is no inserted component or film layer between the two.

The terms "about", "equal", "equivalent", "identical", "substantially" or "approximately" are generally interpreted as being within 20% of a given value or range, or interpreted as being within 10%, within 5%, within 3%, within 2%, within 1%, or within 0.5%. In addition, the terms "a given range is a first value to a second value" and "a given range falls within a range of a first value to a second value" means that the given range includes the first value, the second value and other values in between.

In some embodiments of the disclosure, terms such as "connected", "interconnected", or the like regarding bonding and connection, unless specifically defined, may mean that two structures are in direct contact, or that two structures are not in direct contact, in which there are other structures located between these two structures. The terms of bonding and connecting may also include the case where both structures are movable or both structures are fixed. In addition, the terms "electrical connection" and "coupling" include any direct and indirect means of electrical connection.

In the following embodiment, the same reference symbols or numerals are used to indicate the same or similar components, and the descriptions will be omitted. In addition, the features in different embodiments can be mixed and matched arbitrarily as long as they do not violate or conflict with the spirit of the disclosure, and simple equivalent changes and modifications made in accordance with this specification or claims are still within the scope of the disclosure. In addition, the terms "first", "second" and the like mentioned in the specification or claims are only used to name different components or to distinguish embodiments or ranges, and are not used to limit the upper or lower limit of the number of components; nor are they used to limit the manufacturing order or the disposition order of the components.

The electronic device disclosed in the disclosure may include, for example, a display device, an antenna device, a sensing device, an illuminating display, or a splicing display, but the disclosure is not limited thereto. The electronic display may also be a bendable or flexible device. The electronic display may, for example, include a liquid crystal layer or a light-emitting diode. The light-emitting diode may include, for example, an organic light-emitting diode (OLED), a sub-millimeter light-emitting diode (mini LED), a micro LED, a quantum dot light-emitting diode (quantum dot LED, which may include QLED and QDLED), and may include fluorescence, phosphor, quantum dot (QD), other suitable materials, or any combination of the above, but the disclosure is not limited thereto. The display device may include a picture generating unit (PGU), and the picture generating unit may include at least a display. The display may include, for example, a self-emitting display and/or a non-self-emitting display, but the disclosure is not limited thereto. Hereinafter, a head-up display will be used as an electronic device to illustrate the content of the disclosure, but the disclosure is not limited thereto.

FIG. 1 is a schematic diagram of a head-up display HUD1 according to a first embodiment of the disclosure. Please refer to FIG. 1. The head-up display HUD1 may include an optical system 1. The optical system 1 may include a self-emitting display 10 and an optical element 12, but the disclosure is not limited thereto.

The self-emitting display 10 may emit a collimated light B from a surface S. The self-emitting display 10 may include a light-emitting diode, a light conversion layer or other suitable materials, or a combination of the above, but the disclosure is not limited thereto. The light-emitting diode may, for example, include an inorganic light-emitting diode, an organic light-emitting diode (OLED), a sub-millimeter light-emitting diode (mini-LED), a micro light-emitting diode (micro LED) or a quantum dot light-emitting diode (QLED or QDLED), but the disclosure is not limited thereto. The light conversion layer may include a wavelength conversion material and/or a light filter material. The light conversion layer may include, for example, fluorescence, phosphor, quantum dot, other suitable materials, or a combination of the above, but the disclosure is not limited thereto.

The optical element 12 may be disposed on a moving path P1 of the collimated light B. In other words, the path of the collimated light B reaches or passes through the optical element 12, and the collimated light B may, for example, be reflected or penetrated by the optical element 12. In FIG. 1, the optical element 12 may be disposed on the moving path P1 of the collimated light B coming from the surface S, in which the optical element 12 may be a reflector (for example, a flat mirror). The path of the collimated light B coming from the surface S reaches the optical element 12, and the collimated light B coming from the surface S is reflected by the optical element 12, but the disclosure is not limited thereto. In other embodiments, the optical element 12 may be a reflector, a lens, or a combination of the above. With a configuration where the optical element 12 is a lens, the path of the collimated light B passes through the optical element 12, and the collimated light B may penetrate or be refracted by the optical element 12, but the disclosure is not limited thereto. In an embodiment, the optical element 12 may be the first optical element that the collimated light B reaches after leaving the surface S, but the disclosure is not limited thereto.

According to different requirements, the optical system 1 may also include other elements. For example, the optical system 1 may further include an optical element 14 and an optical element 16. In some embodiments, the optical system 1 may further include an optical element 18. However, it should be understood that the number of optical elements, the relative disposition relation between the optical elements, or the moving path of the light in the optical system 1 may be changed according to requirements, and is not limited to what is shown in FIG. 1.

The optical element 14 is provided on a moving path P2 of the light coming from the optical element 12. For example, the optical element 14 may be a reflector (such as a flat mirror), and the collimated light B from the optical element 12 is reflected by the optical element 14, but the disclosure is not limited thereto. In other embodiments, the optical element 14 may also be a reflector, a lens, or a combination of the above.

The optical element 16 is provided on a moving path P3 of the light coming from the optical element 14. For example, the optical element 16 may be a reflector (such as a concave mirror), and the collimated light B coming from the optical element 14 is reflected by the optical element 16, but the disclosure is not limited thereto. In other embodiments, the optical element 16 may also be a reflector, a lens, or a combination of the above.

The optical element 18 is provided on a moving path P4 of the light coming from the optical element 16. For example, the optical element 18 may be a windshield, and the optical element 18 may be configured to reflect the light coming from the optical element 16 to user's eye E, such that the user may see a virtual image IM of the image displayed by the self-emitting display 10, in which a size of the virtual image IM may be the same as or different from the image displayed by the self-emitting display 10. For example, the virtual image IM may be larger than the image displayed by the self-emitting display 10, but the disclosure is not limited thereto.

Figure 2A:
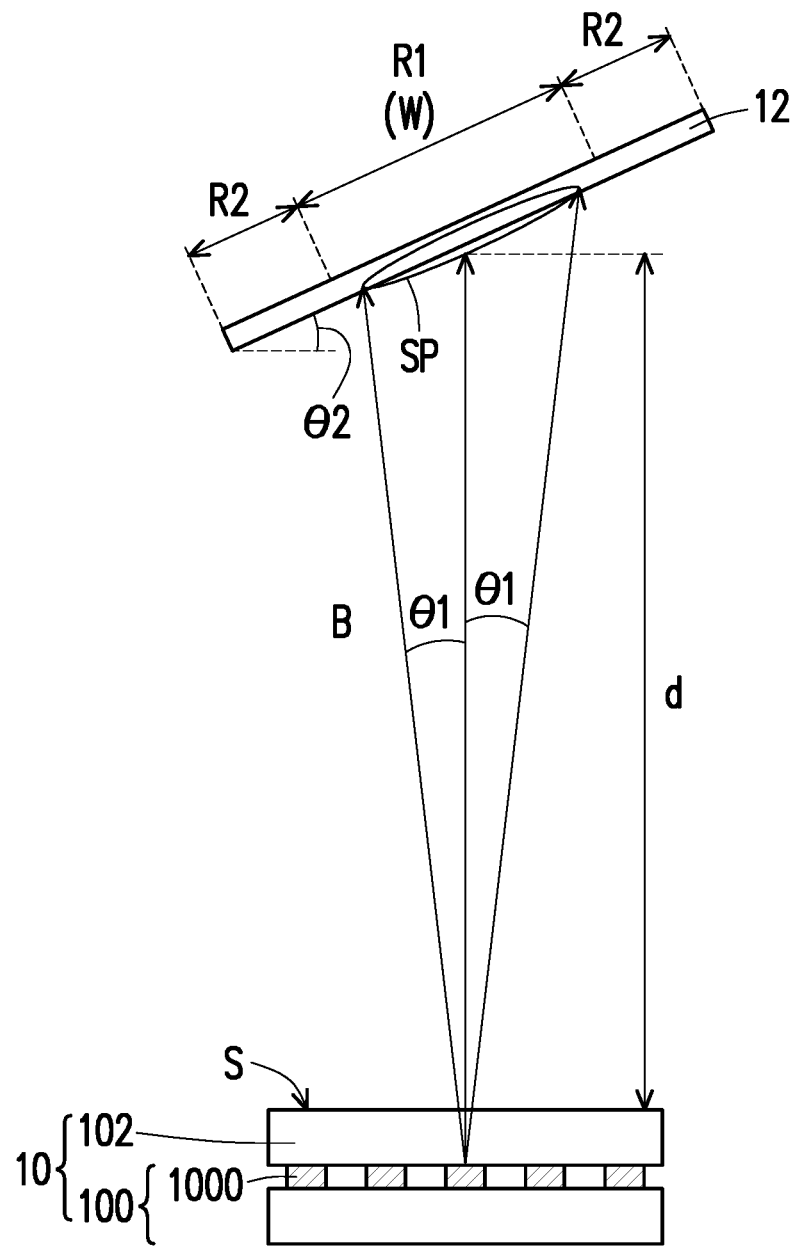
FIG. 2A is a schematic cross-sectional diagram of a self-emitting display and an optical element in FIG. 1.

FIG. 2A is a schematic cross-sectional diagram of a self-emitting display 10 and an optical element 12 in FIG. 1. Please refer to FIG. 2A. The self-emitting display 10 may include a self-emitting display panel 100 and a collimator 102, but the disclosure is not limited thereto. The collimator 102 may be disposed between the self-emitting display panel 100 and the optical element 12, and the collimator 102 may collimate the light emitted by the self-emitting display panel 100.

In detail, the self-emitting display panel 100 may include multiple light-emitting units 1000. The light-emitting unit 1000 may include an inorganic light-emitting diode, an organic light-emitting diode, a sub-millimeter light-emitting diode, a micro light-emitting diode, or a quantum dot light-emitting diode, but the disclosure is not limited thereto.

Figure 3:
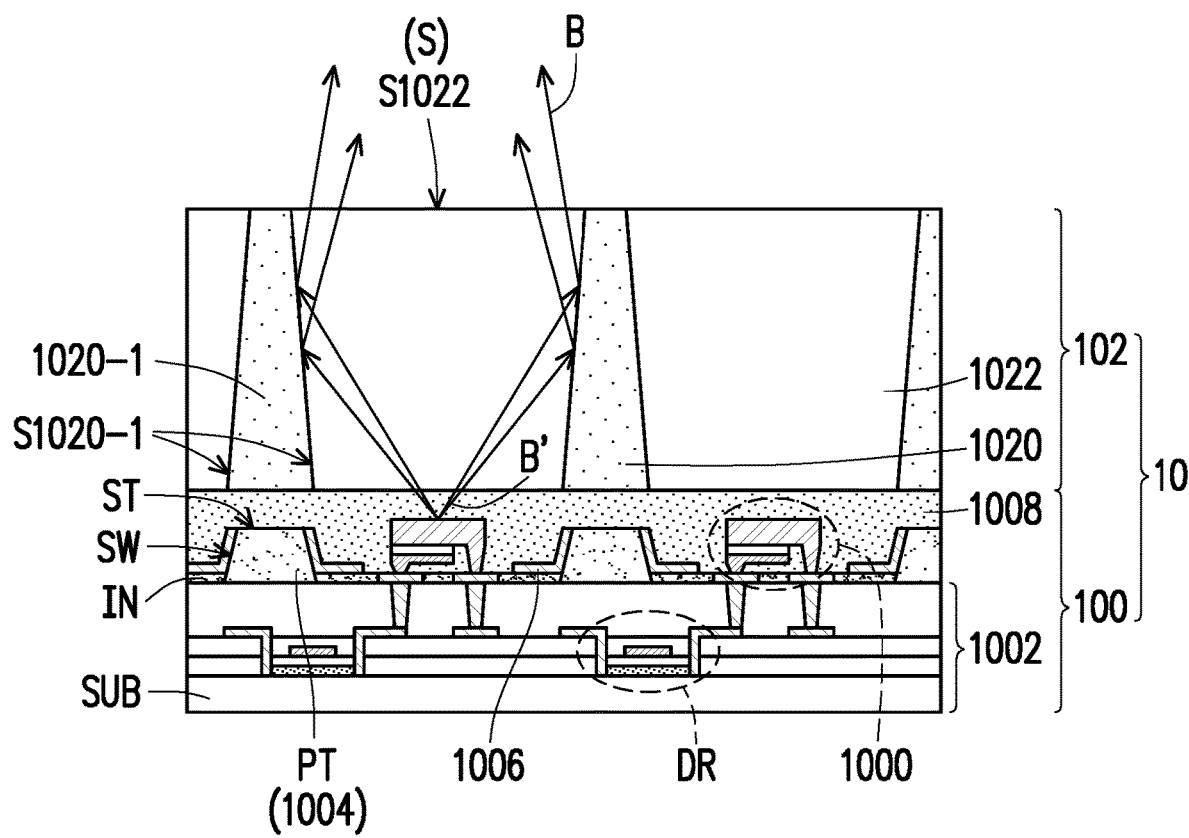
FIG. 3 to FIG. 9 are respectively schematic diagrams of various partial cross-sections of a self-emitting display in FIG. 2A.

The lights output by the multiple light-emitting units 1000 may be collimated by the collimator 102, and then the collimated light B is output from the surface S of the self-emitting display 10. The surface S may be a surface of the self-emitting display 10, such as a surface of the collimator 102 in the self-emitting display 10 or a surface of an encapsulating layer (shown in FIG. 3, for example) in the self-emitting display 10. The collimated light B may refer to the light emitted from the light-emitting unit 1000 in the self-emitting display 10 having a smaller divergent angle after passing through the collimator 102 or which mostly falls within the effective region R1 of the optical element 12, but the disclosure is not limited thereto. The effective region R1 of the optical element 12 is defined as a region in which at least one light path may extend to other optical elements (such as the optical element 14 in FIG. 1) in the optical system. Generally speaking, due to the requirements of manufacturing process or holding, the optical element 12 is also provided with a non-effective region R2 at a periphery of the effective region R1. Compared with the effective region R1 of the optical element 12, most of the lights moved to the non-effective region R2 of the optical element 12 cannot be extended to other optical elements in the optical system.

In the disclosure, the collimator 102 may be configured to collimate the light output by the light-emitting unit 1000, which may effectively improve the light utilization rate or the luminous efficiency, thereby meeting the requirements of energy saving or heat reduction.

In an embodiment, the collimated light B may satisfy a relational formula, for example:

$$\tan\theta 1 \leq \frac{W \times \cos\theta 2}{2d}$$

$\theta 1$ is the divergent angle defined by the moving path of the collimated light B and the surface S. Taking FIG. 2A as an example, a divergent angle $\theta 1$ may be an angle between an edge ray (such as a left or a right ray) in the collimated light B and a normal line of the surface S (see the light in the middle). W may be a width of the effective region R1 of the optical element 12. A cross-section where the width W is located may be a cross-section passing through a center point of the self-emitting display panel 100, and a normal direction of the cross-section is parallel to the surface S, but the disclosure is not limited thereto. The center point of the self-emitting display panel 100 may be defined as an intersection of two diagonal lines of a display region of the self-emitting display panel 100. When the optical element 12 is a curved surface, the width W may be defined as a linear distance between two opposite ends of the effective region R1 on the cross-section. d may be a distance between the self-emitting display 10 and the optical element 12, such as a longitudinal distance from a center point of a light-emitting region on the surface S to the optical element 12, the longitudinal direction may be an extension direction of the line connecting the center point of the light-emitting region on the surface S to the optical element 12, and the extension direction may be parallel to a normal direction of the surface S. $\theta 2$ may be a tilting angle of the optical element 12.

In some embodiments, when the center point of the self-emitting display panel 100 cannot be defined by the above method, a smallest circle or a smallest rectangle may be drawn on a periphery of the self-emitting display panel 100, and a center of the circle or a center of the rectangle may be defined as the center point of the self-emitting display panel 100. For example, if a self-emitting display panel has an irregular shape, two diagonal lines cannot be drawn, and the center point cannot be defined, a minimum circle may be drawn for the self-emitting display panel, and the center of the smallest circle may be defined as the center point, but the disclosure is not limited thereto.

In judging whether the light emitted from the surface S of the self-emitting display 10 is the collimated light B, a measuring machine may be used to measure a light spot SP projected on the optical element 12 by the light emitted from the surface S of the self-emitting display 10, or it may be observed whether the light emitted from the self-emitting display 10 is concentrated and guided to the optical element 12. The measuring machine may be any integrating sphere type spectrum measuring instrument, SR-3, CS2000, DMS or CA310, but the disclosure is not limited thereto.

Figure 2B:
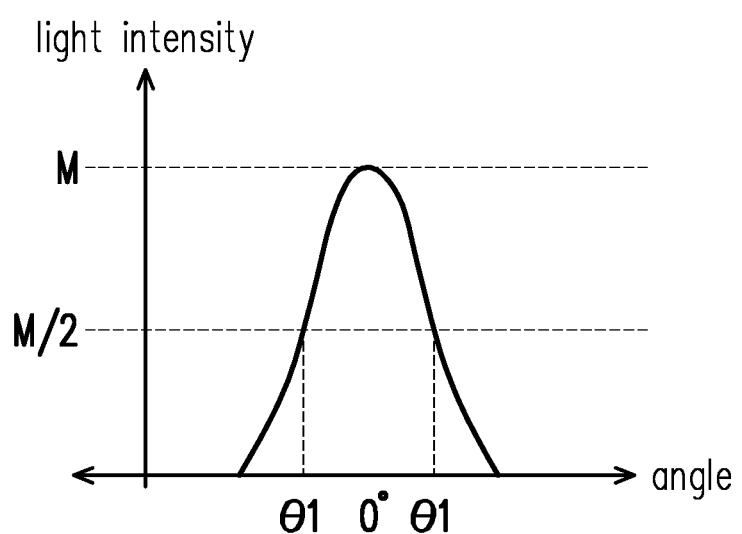
FIG. 2B is an angle-light intensity distribution diagram of a light spot in FIG. 2A.

FIG. 2B is an angle-light intensity distribution diagram of a light spot SP in FIG. 2A. Please refer to FIG. 2A and FIG. 2B. A angle corresponding to a maximum light intensity M of the light spot SP may be defined as an angle of 0 degrees, and an angle corresponding to half of the maximum light intensity M of the light spot SP may be defined as the divergent angle $\theta 1$ of the light spot SP. If the divergent angle $\theta 1$ satisfies the above relational formula, it indicates that the light emitted from the surface S of the self-emitting display 10 is the collimated light. Although a curve shown in FIG. 2B is symmetrical, in some embodiments, the curve of the angle-light intensity distribution diagram of the light spot SP may be asymmetric, so there may be more than two angles corresponding to the maximum light intensity M of the light spot SP. In such case, the smallest angle among the corresponding angles may be defined as the divergent angle $\theta 1$ of the light spot SP, but the disclosure is not limited thereto.

FIG. 3 to FIG. 9 are respectively schematic diagrams of various partial cross-sections of a self-emitting display 10 in FIG. 2A. Please refer to FIG. 3. In the self-emitting display 10, in addition to the multiple light-emitting units 1000, the self-emitting display panel 100 may also include a driving layer 1002, a pixel definition layer 1004, a reflective layer 1006, and an encapsulating layer 1008, but the disclosure is not limited thereto.

In an embodiment, the driving layer 1002 may include a carrier board SUB, multiple driving optical elements DR, other circuits, and/or an insulating layer; the disclosure is not limited thereto. The material of the carrier board SUB may include glass, plastic, wafer, ceramic, other suitable materials, or a combination of the above, but the disclosure is not limited thereto.

The multiple driving optical elements DR may be disposed on the carrier board SUB and electrically connected to the multiple light-emitting units 1000. The multiple driving optical elements DR may include multiple thin film transistors or other types of transistors; the disclosure is not limited thereto.

The pixel definition layer 1004 may be disposed on the driving layer 1002. The material of the pixel definition layer 1004 may include an organic insulating material, but the disclosure is not limited thereto. The pixel definition layer 1004 may include multiple protrusions PT. Each protrusion PT may surround one or more light-emitting units 1000. In some embodiments, in a cross-sectional direction, one or more light-emitting units 1000 may be disposed between two adjacent protrusions PT, but the disclosure is not limited thereto.

The reflective layer 1006 may be disposed on the driving layer 1002 so as to reflect the light, thereby improving a light utilization efficiency. The material of the reflective layer 1006 may include metal, alloy or a combination thereof, but the disclosure is not limited thereto. The reflective layer 1006 may cover regions other than the multiple light-emitting units 1000. For example, in FIG. 3, the reflective layer 1006 may be disposed on a sidewall SW of the protrusion PT. For example, the reflective layer 1006 may also extend toward the corresponding light-emitting unit 1000, but the disclosure is not limited thereto. In some embodiments, the reflective layer 1006 may also be further disposed on a top surface ST of the protrusion PT. In some embodiments, the reflective layer 1006 may be electrically insulated from conductive lines located under the multiple light-emitting units 1000 through an insulating layer IN. In other embodiments, the reflective layer 1006 may be omitted.

The encapsulating layer 1008 may be disposed on the driving layer 1002 and may cover the pixel definition layer 1004, the reflective layer 1006, and the multiple light-emitting units 1000. The material of the encapsulating layer 1008 may include transparent material, water/oxygen barrier material, other suitable materials or a combination of the above, but the disclosure is not limited thereto. For example, the material of the encapsulating layer 1008 may include epoxy, acrylic-based resin, silicone, polyimide polymer, or a combination of the above, but the disclosure is not limited thereto.

The collimator 102 may include a blocking wall 1020 and a filling layer 1022. The blocking wall 1020 is disposed on the encapsulating layer 1008 of the self-emitting display panel 100 and, for example, is located above the protrusions PT. The blocking wall 1020 may converge a divergent angle of a light B' emitted by the light-emitting unit 1000 by reflecting the light, such that the self-emitting display 10 emits the collimated light B from the surface S, but the disclosure is not limited thereto. In other embodiments, the blocking wall 1020 may absorb the part of the light with a larger divergent angle such that the part of the light with a smaller divergent angle leaves the surface S. In some embodiments, the material of the blocking wall 1020 may include a light-shielding material, such as a light-reflecting material or a light-absorbing material, but the disclosure is not limited thereto. In still other embodiments, the material of the blocking wall 1020 may include a dielectric material. For example, a body 1020-1 of the blocking wall 1020 may be formed of plastic, and a light-shielding layer may be formed on a sidewall surface S1020-1 of the body (for example, a reflective layer is formed, to reflect the light B').

The filling layer 1022 may be disposed on the encapsulating layer 1008 of the self-emitting display panel 100 and located between the multiple bodies 1020-1 of the blocking wall 1020. The material of the filling layer 1022 may include transparent material, water/oxygen barrier material, other suitable materials or a combination of the above, but the disclosure is not limited thereto. For example, the material of the filling layer 1022 may include epoxy, acrylic-based resin, silicone, polyimide polymer, or a combination of the above, but the disclosure is not limited thereto. In some embodiments, it may be designed to match the refractive index of the filling layer 1022 and the refractive index of the encapsulating layer 1008. For example, the refractive index difference between the filling layer and the encapsulating layer may be within 1, such as 0.2, 0.4, 0.6 or 0.8, but not limited thereto, so as to reduce an interface reflection and increase overall optical utilization. With the configuration of FIG. 3, the surface S of the self-emitting display panel 100 is an outer surface S1022 of the filling layer 1022. In some embodiments, the collimator 102 may further include a wavelength conversion material. The wavelength conversion material may be located between the multiple bodies 1020-1 of the blocking wall 1020. For example, the wavelength conversion material may convert short-wavelength light (such as blue light) into long-wavelength light (such as green light or red light), but the disclosure is not limited thereto.

Figure 4:
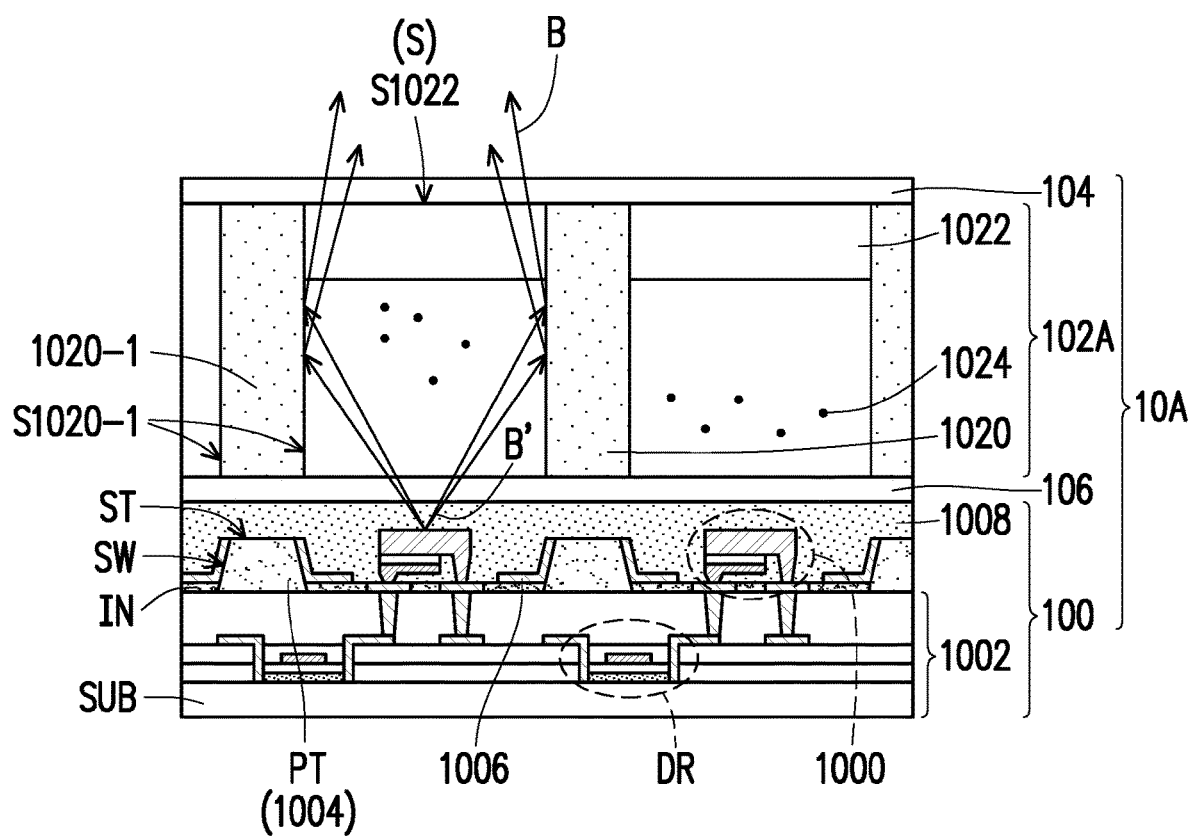

Please refer to FIG. 4. The self-emitting display 10A includes the self-emitting display panel 100, a collimator 102A, a substrate 104, and an adhesive layer 106. The collimator 102A is disposed on the substrate 104 and located between the substrate 104 and the adhesive layer 106. The collimator 102A may include the blocking wall 1020, the filling layer 1022, and a wavelength conversion material 1024. The wavelength conversion material 1024 may be disposed between the multiple bodies 1020-1 of the blocking wall 1020 and between the filling layer 1022 and the adhesive layer 106. The wavelength conversion material 1024 may include fluorescence, phosphor, quantum dots, other suitable materials, or a combination of at least two of the foregoing. In other embodiments, the wavelength conversion material 1024 may be disposed on the substrate 104. The substrate 104 is may be transparent substrate. For example, the substrate 104 may include a glass substrate, a plastic substrate, or a composite board, but the disclosure is not limited thereto. The adhesive layer 106 is configured to attach the collimator 102A to the self-emitting display panel 100. For example, the adhesive layer 106 may include optical glue, but the disclosure is not limited thereto.

Figure 5:
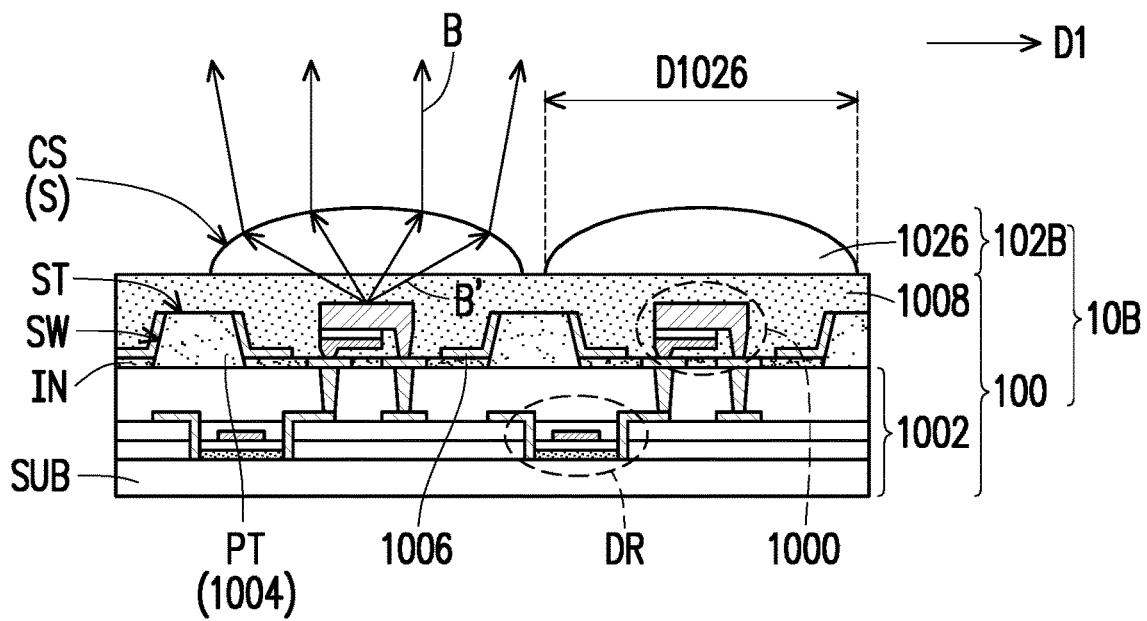

Please refer to FIG. 5. A self-emitting display 10B may include the self-emitting display panel 100 and a collimator 102B. The collimator 102B may include multiple microlenses 1026. The multiple microlenses 1026 may be disposed on the encapsulating layer 1008 of the self-emitting display panel 100 and above the multiple light-emitting units 1000. The material of the multiple microlenses 1026 may include a dielectric material. The curved surface CS of the multiple microlenses 1026 may converge the divergence angles of the light B' emitted by the light-emitting unit 1000 by refracting the light, such that the self-emitting display 10B emits the collimated light B from the surface S. With the configuration of FIG. 5, the surface S is the curved surface CS of the multiple microlenses 1026. With the configuration of FIG. 5, a width D1026 of the microlens 1026 may be a maximum width in a direction D1, but the disclosure is not limited thereto.

Figure 6:
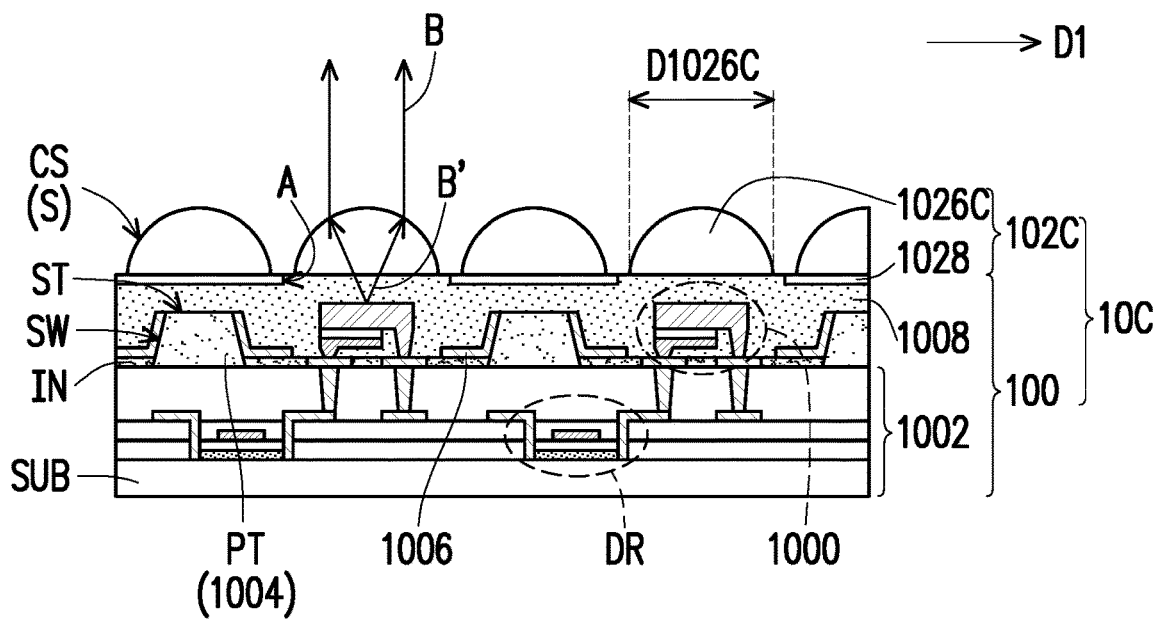

Please refer to FIG. 6. A self-emitting display 10C may include the self-emitting display panel 100 and a collimator 102C. The collimator 102C may include multiple microlenses 1026C and a light shielding layer 1028. The light shielding layer 1028 is disposed on the encapsulating layer 1008 of the self-emitting display panel 100 and may be made of light-absorbing material. The light-absorbing material may include black ink or black matrix, and the material of the black matrix may be resin, but the disclosure is not limited thereto. The light shielding layer 1028 has multiple openings A. The multiple openings A overlap the multiple light-emitting units 1000. In some embodiments, due to the consideration of manufacturing convenience, the multiple microlenses 1026C may be disposed in the multiple openings A and on the light shielding layer 1028. In other embodiments, the multiple microlenses 1026C may be disposed in the multiple openings A but not disposed on the light shielding layer 1028. With the configuration of FIG. 6, a width D1026C of the microlens 1026C may be a maximum width in a direction D1, but the disclosure is not limited thereto. In some embodiments, the width D1026C of the microlens 1026C may be smaller than the maximum width of the light shielding layer 1028 in the direction D1. In other embodiments, the width D1026C of the microlens 1026C may be larger than the maximum width of the light-emitting unit 1000 in the direction D1, but the disclosure is not limited thereto.

Figure 7:
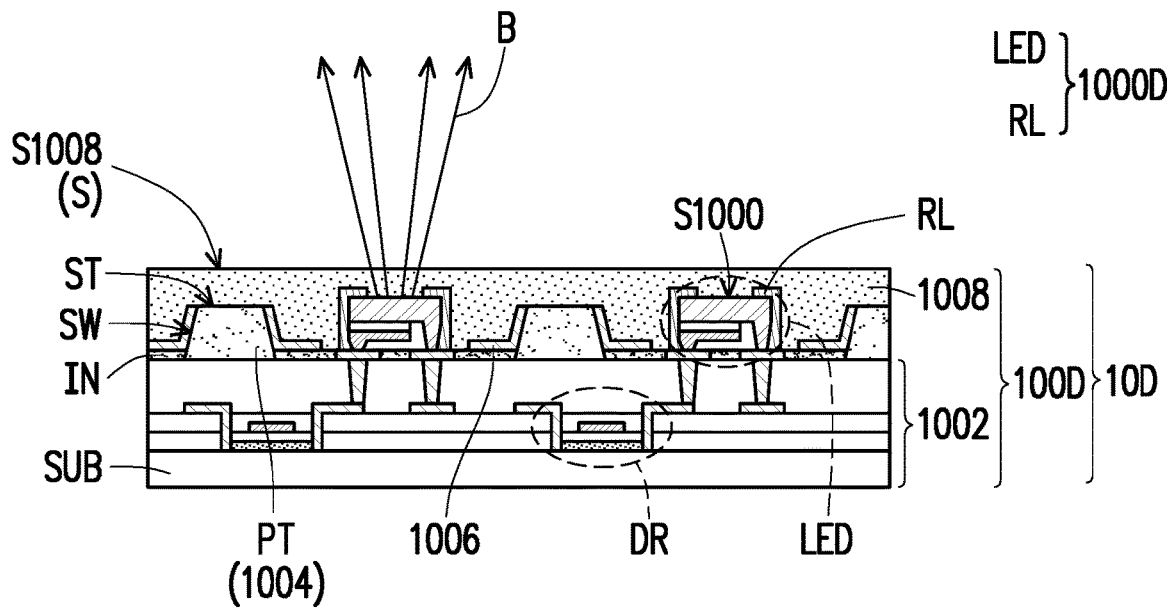

Please refer to FIG. 7. A self-emitting display 10D may include the self-emitting display panel 100D. The self-emitting display panel 100D may include multiple light-emitting units 1000, the driving layer 1002, the pixel definition layer 1004, the reflective layer 1006, and the encapsulating layer 1008, but the disclosure is not limited thereto. The light-emitting unit 1000 may include a light-emitting diode LED and a side reflector (such as a side reflective electrode RL). The side reflective electrode RL may be disposed on the light-emitting diode LED and cover a part of the light-emitting surface S1000 of the light-emitting diode LED (such as a peripheral region) to converge an light-emitting angle of the light-emitting diode LED, such that the multiple light-emitting units 1000 may emit the collimated light B. With the configuration of FIG. 7, the surface S may be an outer surface S1008 of the encapsulating layer 1008.

Figure 8:
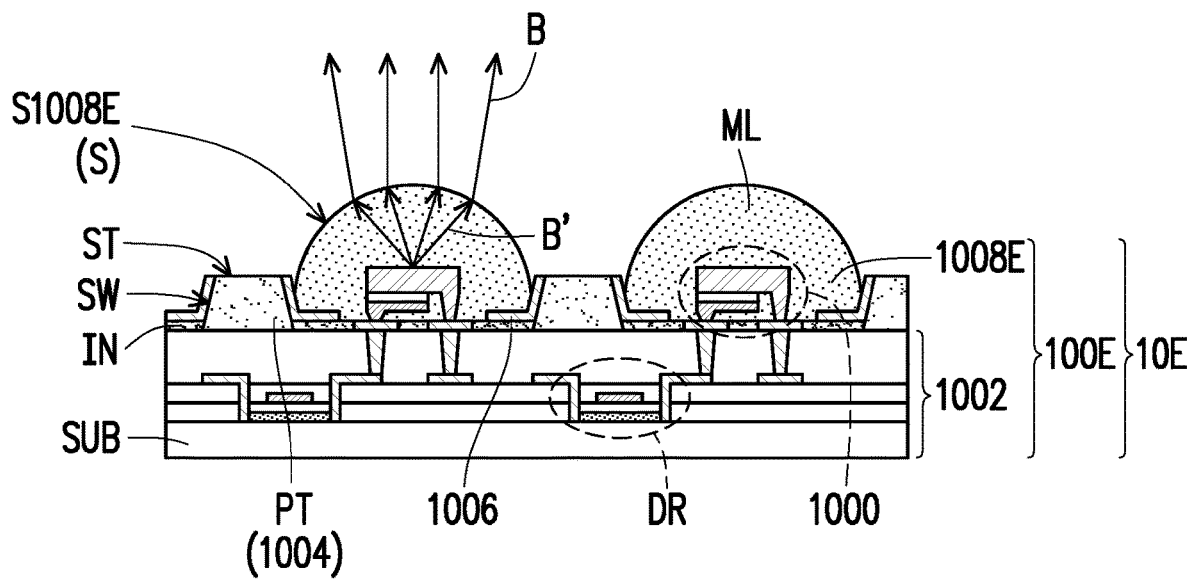

Please refer to FIG. 8. A self-emitting display 10E may include a self-emitting display panel 100E. The self-emitting display panel 100E may include multiple light-emitting units 1000, the driving layer 1002, the pixel definition layer 1004, the reflective layer 1006, and an encapsulating layer 1008E, but the disclosure is not limited thereto. An encapsulation unit ML in the encapsulating layer 1008E may adopt the shape and structure of a microlens, while having effects of blocking water and oxygen and converging the light (collimator). In detail, the encapsulating layer 1008E may include multiple encapsulation units ML, and each encapsulation unit ML may cover one light-emitting unit 1000. With such configuration, the surface S may be an outer surface S1008E of the encapsulating layer 1008E. Moreover, the above-mentioned optical elements or film layers for collimating the light, such as the multiple side reflective electrodes RL in FIG. 7, the multiple microlenses 1026C and the light shielding layer 1028 in FIG. 6, multiple microlenses 1026 in FIG. 5, the blocking wall 1020 in FIG. 3 or FIG. 4, and the filling layer 1022, may be omitted in the self-emitting display 10E, but the disclosure is not limited thereto.

Figure 9:
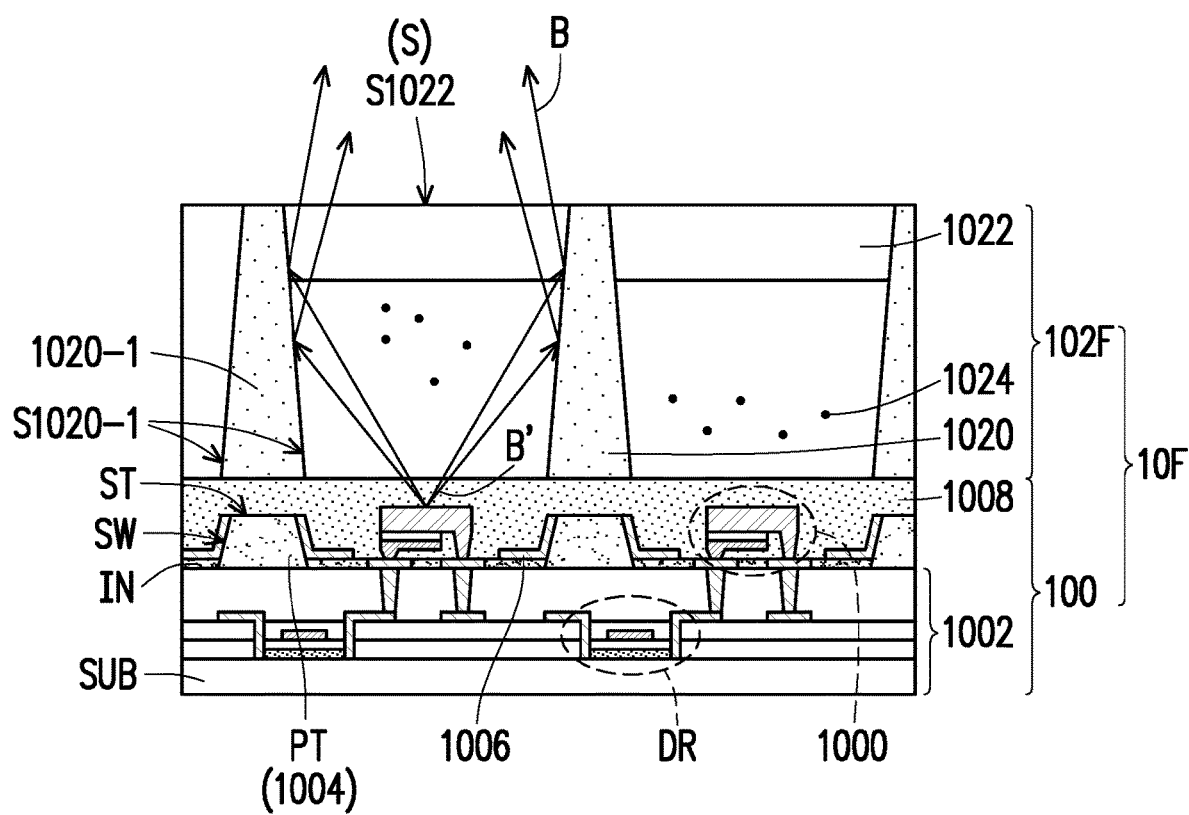

Please refer to FIG. 9. A self-emitting display 10F is similar to the self-emitting display 10 of FIG. 3. The main difference between the two is that a collimator 102F further includes the wavelength conversion material 1024. In other embodiments, the self-emitting display 10F may also include the substrate 104 of FIG. 4. In some embodiments, the wavelength conversion material 1024 may be disposed on the substrate 104. In some embodiments, the self-emitting display 10F may also include the adhesive layer 106 of FIG. 4, and the collimator 102F may be attached to the self-emitting display panel 100 through the adhesive layer 106.

Figure 10:
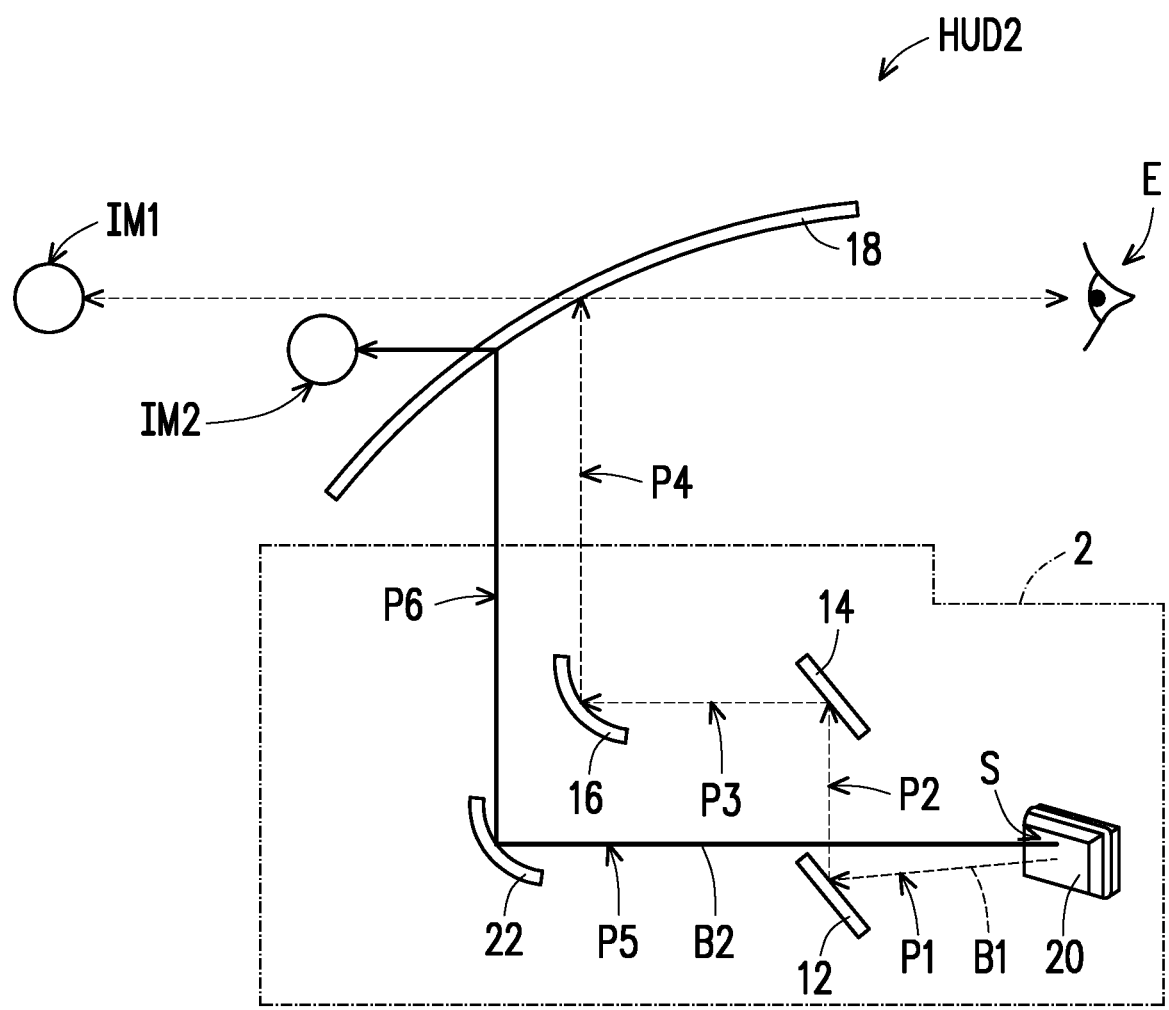
FIG. 10 is a schematic diagram of a head-up display according to a second embodiment of the disclosure.

FIG. 10 is a schematic diagram of a head-up display HUD2 according to a second embodiment of the disclosure. Please refer to FIG. 10. The head-up display HUD2 may include an optical system 2. The optical system 2 may include a self-emitting display 20, the optical element 12, the optical element 14, the optical element 16, and an optical element 22, but the disclosure is not limited thereto. In some embodiments, the optical system 2 may further include the optical element 18, but the disclosure is not limited thereto. However, it should be understood that the number of optical elements in the optical system 2, the relative disposition relation between the optical elements, or the moving path of the light may be changed according to requirements, and is not limited to what is shown in FIG. 10.

The self-emitting display 20 may emit a collimated light B1 and a collimated light B2 from the surface S. FIG. 10 shows moving paths of the collimated light B1 and the collimated light B2 in dashed and solid lines, respectively. As shown by the moving paths of the dashed lines, the optical element 12, the optical element 14, the optical element 16, and the optical element 18 are, for example, sequentially disposed on the moving path P1, the moving path P2, the moving path P3, and the moving path P4 of the collimated light B1 coming from the surface S. As shown by the moving paths of the solid lines, the optical element 22 and the optical element 18 may be sequentially disposed on a moving path P5 of the collimated light B2 coming from the surface S, for example. In some embodiments, the optical element 22 may be a reflector (for example, a concave mirror), and the light coming from the self-emitting display 20 is reflected by the optical element 22, but the disclosure is not limited thereto. In other embodiments, the optical element 22 may also be a reflector, a lens, or a combination of the above.

Different pixel regions (not shown) may be configured in the self-emitting display 20 so as to provide a first image (not shown) and a second image (not shown), where the first image and the second image may be separated by a black frame (such as a black matrix in the self-emitting display 20), but the disclosure is not limited thereto. Since different path lengths form different depths of field, the length of the moving path of the collimated light B1 corresponding to the first image may be made different from the length of the moving path of the collimated light B2 corresponding to the second image by adjusting design parameters of the optical element (such as number, setting angle, or the radian of the optical element, or the like), such that an enlarged virtual image IM1 and an enlarged virtual image IM2 seen by a user have a depth difference.

Figure 11:
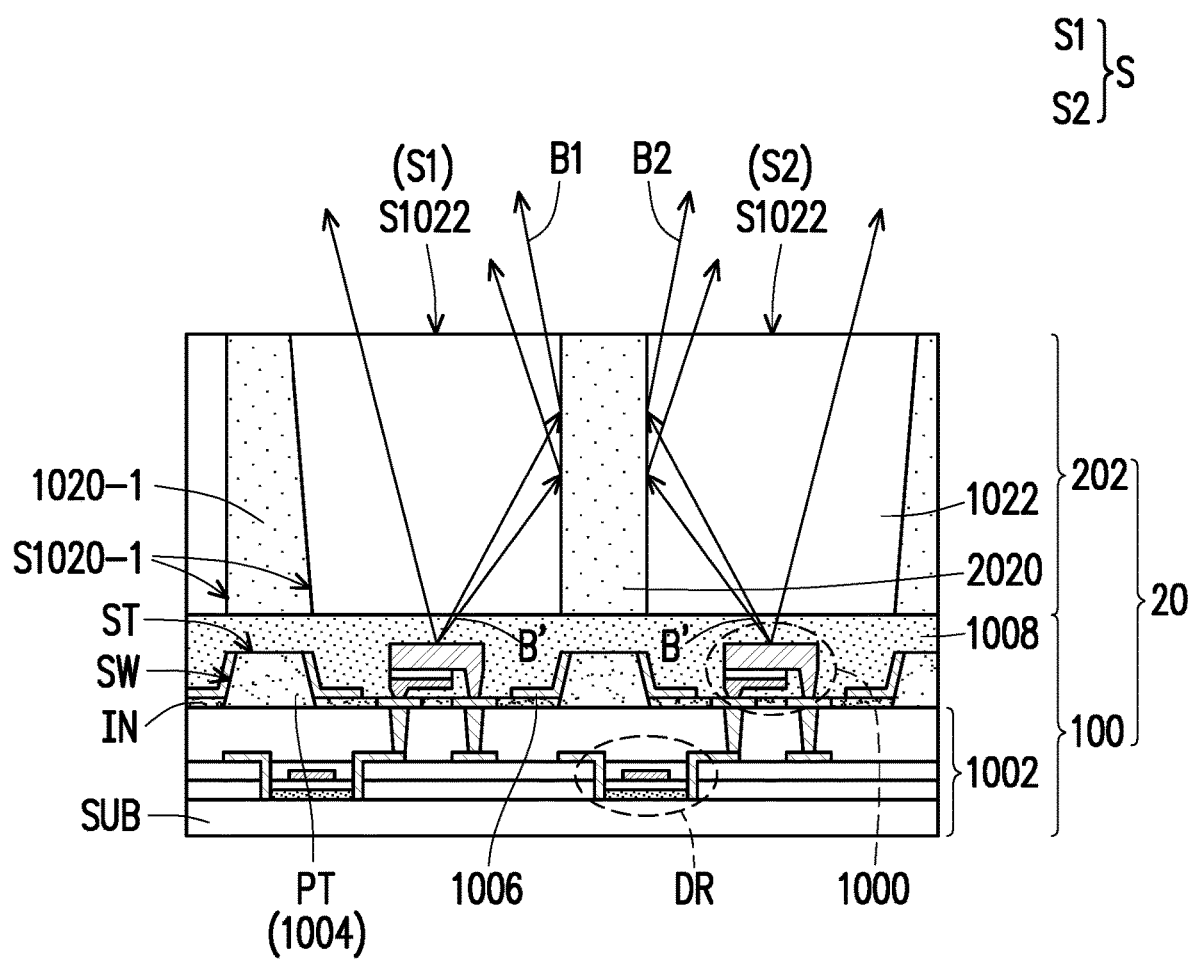
FIG. 11 is a schematic partial cross-sectional diagram of a self-emitting display in FIG. 10.

FIG. 11 is a schematic partial cross-sectional diagram of a self-emitting display in FIG. 20. Please refer to FIG. 11. In the self-emitting display 20, light may be split by changing the design parameters of the blocking wall 1020 in a collimator 202 (such as the shape of the blocking wall 1020, a slope of a sidewall surface S1020-1, or the like), such that the collimated light B1 and the collimated light B2 emitted from the surface S move in different directions, and further, as shown in FIG. 10, the collimated light B1 and the collimated light B2 move to the optical element 12 and the optical element 22 respectively along different moving paths (or moving directions). For convenience of description, the surface S from which the collimated light B1 is emitted is referred to as a first surface S1 hereinafter, and the surface S from which the collimated light B2 is emitted is referred to as a second surface S2. In other embodiments, the design parameters of the collimator in FIG. 4 to FIG. 9 (such as the shape of the blocking wall 1020 in FIG. 4 or FIG. 9; the slope of the sidewall surface S1020-1; the curved surface design of the microlens 1026 in FIG. 5 or FIG. 6; the shape or configuration of the side reflector in FIG. 7; and the curved surface design of the outer surface S1008E of the encapsulating layer 1008E in FIG. 8) may also be changed, such that the collimated light B1 emitted from the first surface S1 and the collimated light B2 emitted from the second surface S2 move in different moving directions.

Figure 12:
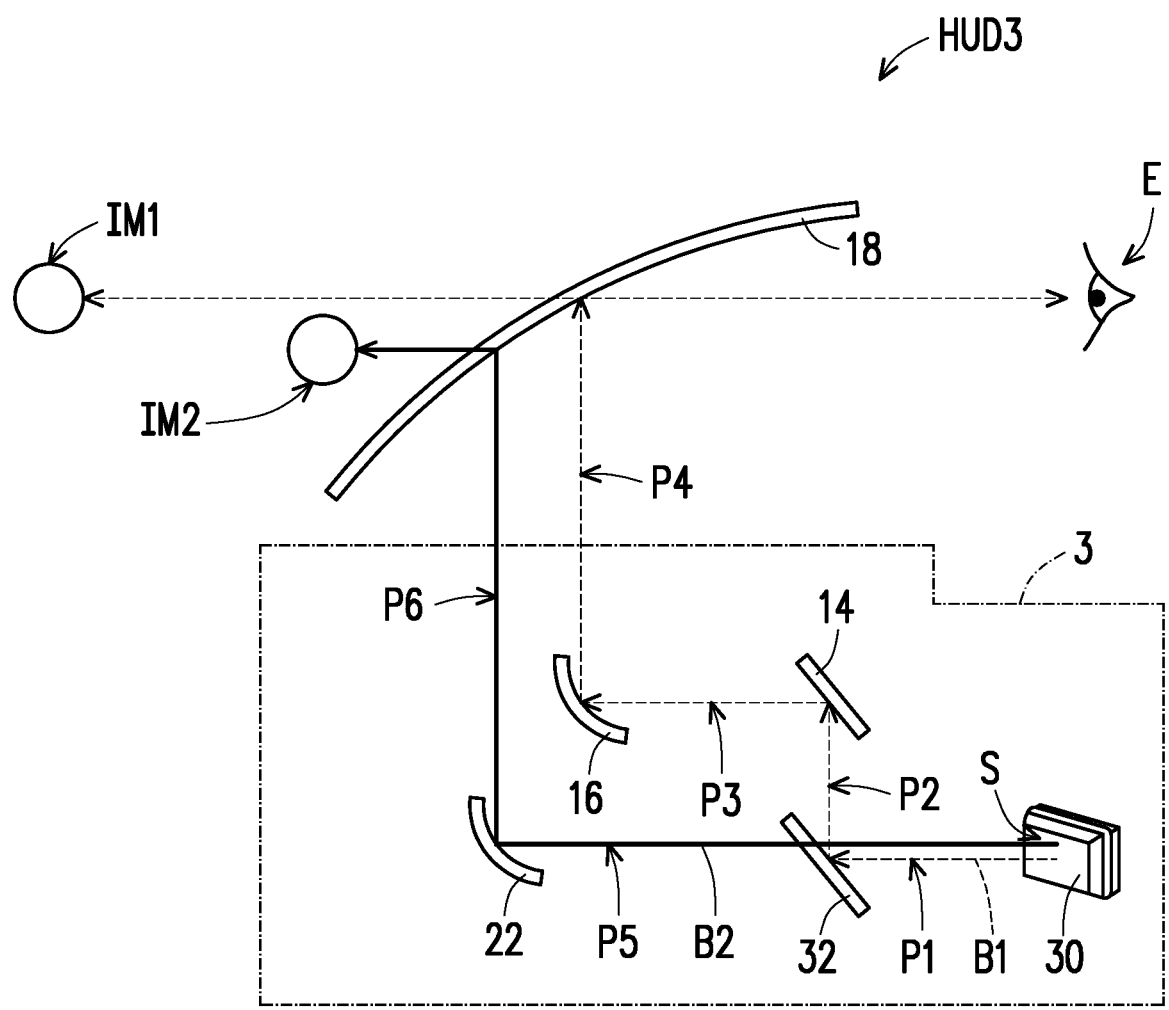
FIG. 12 is a schematic diagram of a head-up display according to a third embodiment of the disclosure.

FIG. 12 is a schematic diagram of a head-up display HUD3 according to a third embodiment of the disclosure. Please refer to FIG. 12. The head-up display HUD3 may include an optical system 3. The optical system 3 may include a self-emitting display 30, an optical element 32, the optical element 14, the optical element 16, and an optical element 22, but the disclosure is not limited thereto. In some embodiments, the optical system 3 may further include an optical element 18, but the disclosure is not limited thereto. However, it should be understood that the number of optical elements in the optical system 3, the relative disposition relation between the optical elements, or the moving path of the light may be changed according to requirements, and is not limited to what is shown in FIG. 12.

In the optical system 3, the optical element 32 is disposed on the moving path P5 of the collimated light B2 coming from the surface S in addition to being disposed on the moving path P1 of the collimated light B1 coming from the surface S. In other words, the collimated light B2 coming from the surface S sequentially moves to the optical element 18 via the optical element 32 and the optical element 22. With such configuration, the optical element 32 may be a polarization separator, and the collimated light B1 and the collimated light B2 may respectively have different polarization states (such as s-polarization state and p-polarization state), such that the collimated light B1 and the collimated light B2 moved to the optical element 32 are respectively reflected by and penetrate the optical element 32, and then respectively move to the optical element 14 and the optical element 22. The configuration of the polarization separator helps reduce a volume of the optical system 3.

For example, the self-emitting display 30 may provide the first image (not shown) and the second image (not shown) in a first timing and a second timing, respectively, where the collimated light B1 corresponding to the first image and the collimated light B2 corresponding to the second image may be moved to the user's eye E through different moving paths and different path lengths, such that the enlarged virtual image IM1 and the enlarged virtual image IM2 seen by the user have a depth difference.

Figure 13:
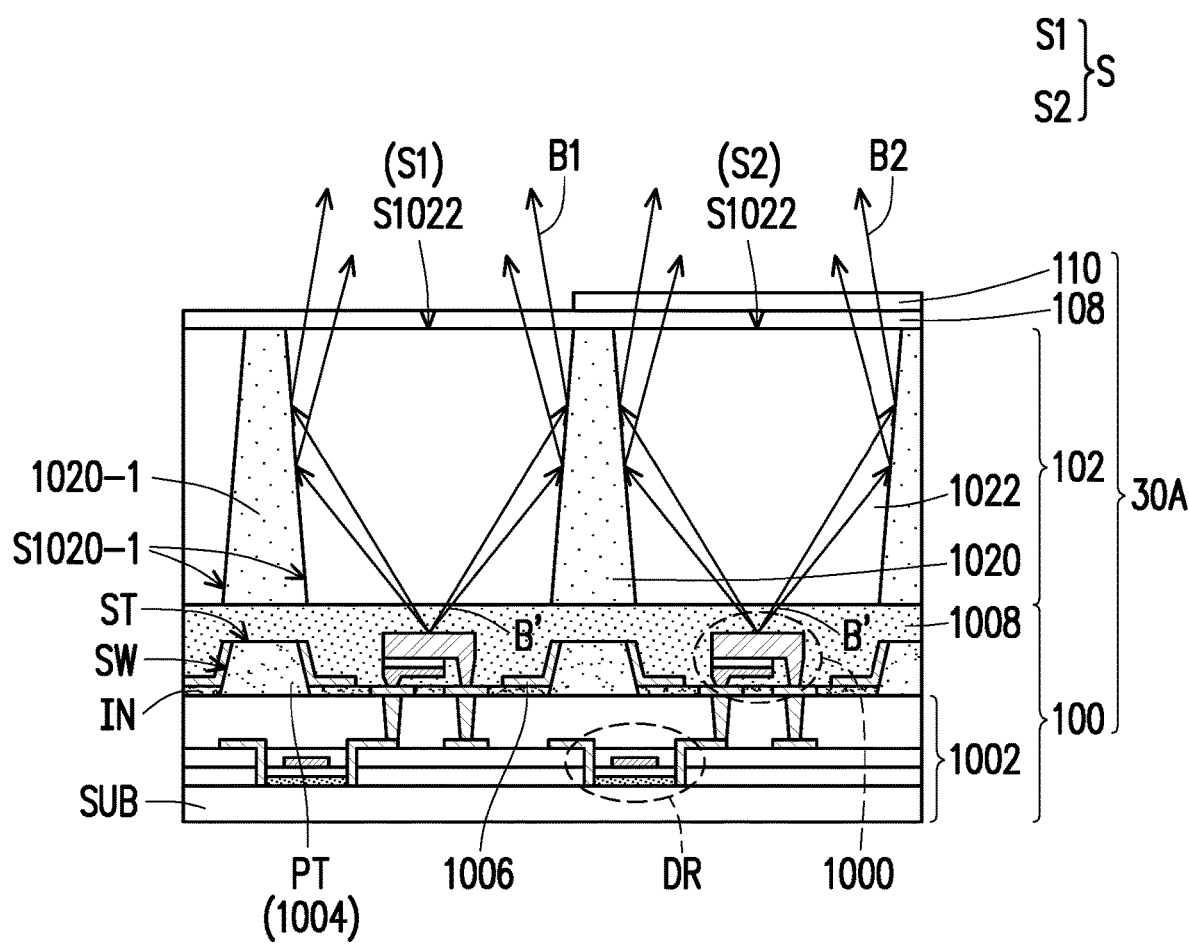
FIG. 13 and FIG. 14 are respectively schematic diagrams of various partial cross-sections of a self-emitting display in FIG. 12.
Figure 14:
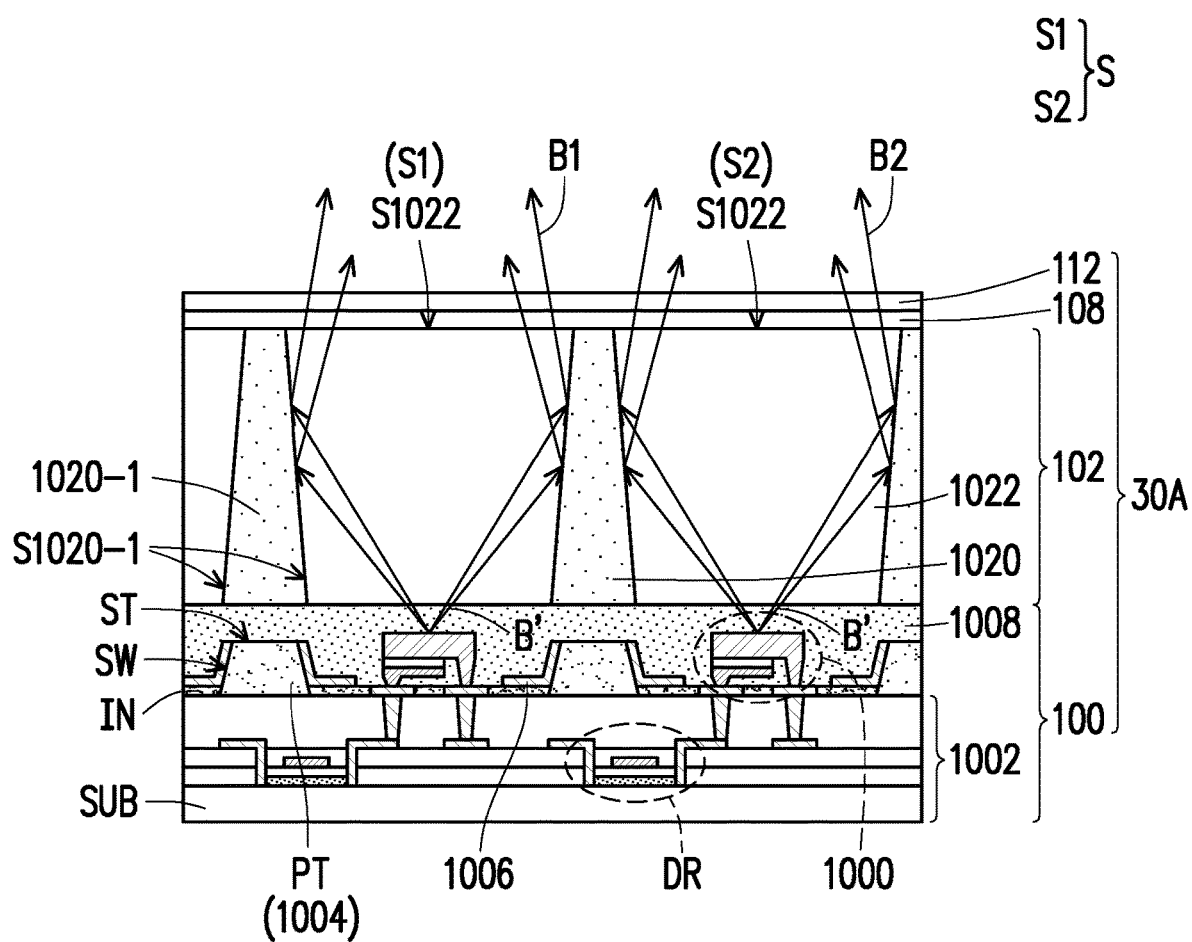

FIG. 13 and FIG. 14 are respectively schematic diagrams of various partial cross-sections of the self-emitting display 30 in FIG. 12. First referring to FIG. 13, the self-emitting display 30 may include the self-emitting display panel 100, the collimator 102, the polarizer 108, and a half-wave plate 110, but the disclosure is not limited thereto.

The polarizer 108 is disposed on the collimator 102 and covers the first surface S1 and the second surface S2. The half-wave plate 110 is disposed on the polarizer 108 and covers the second surface S2 but not the first surface S1. With such design, the collimated light B1 and the collimated light B2 can have different polarization states. For example, the polarization states of the collimated light B1 and the collimated light B2 may be p-polarization state and s-polarization state, respectively, but are the disclosure is not limited thereto.

Please refer to FIG. 14. A self-emitting display 30A may include the self-emitting display panel 100, the collimator 102, the polarizer 108, and a switchable retardation cell 112, but the disclosure is not limited thereto. The switchable retardation cell 112 is disposed on the polarizer 108 and covers the first surface S1 and the second surface S2. For example, the switchable retardation cell 112 may include two transparent electrode layers (not shown) and a liquid crystal layer (not shown) located between the two transparent electrode layers. By controlling an electric field between the two transparent electrode layers, a tilting direction of the liquid crystal layer may be controlled, thereby controlling a phase retardation of the switchable retardation cell 112. In some embodiments, each transparent electrode layer may be a patterned electrode layer. For example, the transparent electrode layer is provided with separate electrodes above the first surface S1 and the second surface S2. In this way, by controlling the electric field by regions, the switchable retardation cell 112 may have different phase retardations in the regions corresponding to the first surface S1 and the second surface S2, thereby making the collimated light B1 and the collimated light B2 have different polarization states.

Figure 15:
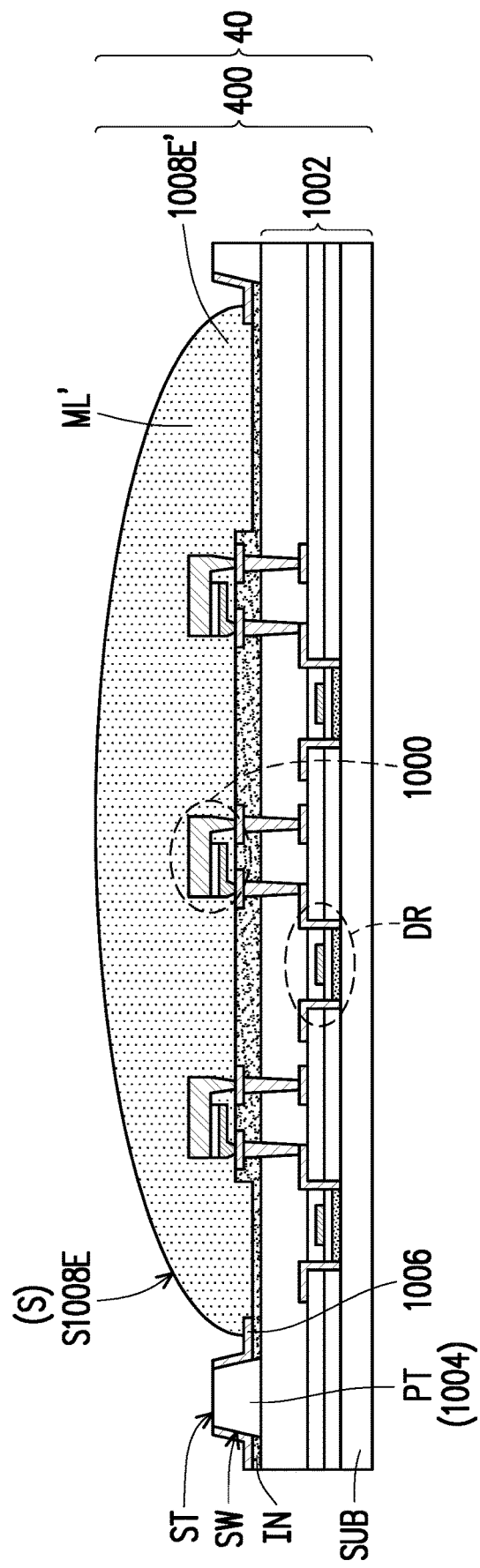
FIG. 15 is a schematic partial cross-sectional diagram of a self-emitting display according to another embodiment of the disclosure.

FIG. 15 is a schematic partial cross-sectional diagram of a self-emitting display 40 according to another embodiment of the disclosure. The self-emitting display 40 is similar to the self-emitting display 10E of FIG. 8; the main difference between the two lies in the design of an encapsulating layer 1008E' in a self-emitting display panel 400. To be specific, an encapsulation unit ML' of the encapsulating layer 1008E' may cover multiple light-emitting units 1000. The encapsulation unit ML' may have the shape and structure of a microlens, but the disclosure is not limited thereto. In some embodiments, the multiple light-emitting units 1000 covered by the same encapsulation unit ML' may be light-emitting units of different colors, such as red light-emitting units, green light-emitting units, and blue light-emitting units, but are the disclosure is not limited thereto.

In summary, in the embodiments of the disclosure, by making the self-emitting display emit a collimated light coming from the surface, the light utilization rate or the luminous efficiency may be effectively improved, thereby meeting the requirements of energy saving or heat reduction.

The above embodiments are only used to illustrate, but not to limit, the technical solutions of the disclosure. Although the disclosure has been described in detail with reference to the foregoing embodiments, those of ordinary skill in the art should understand that they may still modify the technical solutions described in the foregoing embodiments, or equivalently replace some or all of the technical features. These modifications or replacements do not cause the essence of the corresponding technical solutions to deviate from the scope of the technical solutions of the embodiments of the disclosure.

Although the embodiments of the disclosure and the advantages have been disclosed as above, it should be understood that any person with ordinary knowledge in the art may make changes, substitutions and modifications without departing from the spirit and scope of the disclosure, and the features of the embodiments can be arbitrarily mixed and replaced to form other new embodiments. In addition, the scope of protection afforded by the disclosure is not limited to the processes, machines, fabrications, material compositions, devices, methods, and procedures in the specific embodiments described in the specification. From the contents of the disclosure, anyone with ordinary knowledge in the art can understand the current or future developed processes, machines, fabrications, compositions of material, devices, methods, and procedures, and can use the same in accordance with the disclosure, as long as substantially the same functions or the substantially same results are to be achieved in the embodiments described herein. Therefore, the scope of protection of the disclosure includes the above-mentioned processes, machines, fabrications, material compositions, devices, methods, and procedures. In addition, each claim constitutes a separate embodiment, and the scope of protection of the disclosure also includes the combination of each claim and embodiment. The scope of protection of the disclosure shall be determined by the appended claims.

What is claimed is:

1. An optical system, comprising:
   a display, emitting a collimated light from a surface, comprising:
      a plurality of light-emitting units;
      an encapsulating layer covering the plurality of light-emitting units; and
      a collimator disposed on the encapsulating layer and comprising a plurality of collimating units collimating an emitting light emitting from the plurality of light-emitting units; and
   an optical element, disposed on a moving path of the collimated light,
   wherein at least one of the plurality of collimating units has a first side and a second side, and a projection length of the first side is different from a projection length of the second side,
   wherein an absolute value of a slope of the first side is different from an absolute value of a slope of the second side.

2. The optical system according to claim 1, wherein the optical element is a reflector, a lens, or a combination thereof.

3. The optical system according to claim 1, wherein the moving path of the collimated light and the surface define a divergent angle θ1, and the divergent angle θ1 satisfies a following relation:

$$\tan\theta 1 \leq \frac{W \times \cos\theta 2}{2d}$$

wherein W is a width of an effective region of the optical element, d is a distance between the display and the optical element, and θ2 is a tilting angle of the optical element.

4. The optical system according to claim 1, wherein the display further comprises a display panel, and the collimator is disposed between the display panel and the optical element.

5. The optical system according to claim 1, wherein the plurality of light-emitting units emit the collimated light.

6. The optical system according to claim 5, wherein the light-emitting unit is an packaged light-emitting diode.

7. A head-up display, comprising:
   an optical system, comprising:
      a display, emitting a collimated light from a surface, comprising:
         a plurality of light-emitting units;
         an encapsulating layer covering the plurality of light-emitting units; and
         a collimator disposed on the encapsulating layer and comprising a plurality of collimating units collimating an emitting light emitting from the plurality of light-emitting units; and
      an optical element, disposed on a moving path of the collimated light,
      wherein at least one of the plurality of collimating units has a first side and a second side, and a projection length of the first side is different from a projection length of the second side,
      wherein an absolute value of a slope of the first side is different from an absolute value of a slope of the second side.

8. The optical system according to claim 7, wherein the display comprises a pixel definition layer, and the pixel definition layer is disposed between the plurality of light-emitting units.

9. The optical system according to claim 7, wherein the display comprises a reflective layer, and the reflective layer is disposed between the plurality of light-emitting units.

10. The optical system according to claim 7, wherein the collimator further comprises a light shielding layer, and the light shielding layer is disposed between the plurality of light-emitting units.

* * * * *